United States Patent [19]

Euchner et al.

[11] Patent Number: 6,052,787
[45] Date of Patent: Apr. 18, 2000

[54] PROCESS FOR GROUP-BASED CRYPTOGRAPHIC CODE MANAGEMENT BETWEEN A FIRST COMPUTER UNIT AND GROUP COMPUTER UNITS

[75] Inventors: Martin Euchner, München; Wolfgang Klasen, Dachau; Volker Kessler, Vierkirchen, all of Germany

[73] Assignee: Siemens Aktiengesellschaft, Munich, Germany

[21] Appl. No.: 09/194,729

[22] PCT Filed: May 16, 1997

[86] PCT No.: PCT/DE97/01001

§ 371 Date: Dec. 2, 1998

§ 102(e) Date: Dec. 2, 1998

[87] PCT Pub. No.: WO97/47108

PCT Pub. Date: Dec. 11, 1997

[30] Foreign Application Priority Data

Jun. 5, 1996 [DE] Germany .................. 196 22 630

[51] Int. Cl.[7] .................................................. G06F 17/21
[52] U.S. Cl. ................................. 713/201; 380/30
[58] Field of Search .................. 713/201, 163; 707/9; 380/30

[56] References Cited

U.S. PATENT DOCUMENTS

| 5,220,604 | 6/1993 | Gasser et al. ............................ 707/9 |
|---|---|---|
| 5,224,163 | 6/1993 | Gasser et al. ............................ 380/30 |
| 5,315,657 | 5/1994 | Abadi et al. ............................. 713/201 |
| 5,577,209 | 11/1996 | Boyle et al. ............................. 713/201 |
| 5,748,736 | 5/1998 | Mittra ....................................... 713/163 |

FOREIGN PATENT DOCUMENTS

| 0 307 627 A1 | 3/1989 | European Pat. Off. . |
|---|---|---|
| 0 402 083 A2 | 12/1990 | European Pat. Off. . |
| WO 95/08885 | 3/1995 | WIPO . |

OTHER PUBLICATIONS

Bruce Schneier. "Applied Cryptography" 2d. (New York: John Wiley & Sons, Inc., 1996) pp. 22, 23, 234, 235 & 389, Jan. 1, 1996.

IEEE Personal Communications vol. 1, (1994) 1st Quarter, No. 1, New York, A. Aziz et al, "Privacy and Authentication for Wireless Local Area Networks", pp. 25–31.

Proceedings of the International Carnahan Conference on Security Technology, Zurich, Switzerland, Chorley, B.J. et al, "The Definition and Implementation of a Secure Communications–Protocol", pp. 95–102.

ISBN 3–446–16272–0, Sead Muftic, "Sicherheits–mechanismen für Rechnernetze", (1992), pp. 34–70.

Primary Examiner—James P. Trammell
Assistant Examiner—John Leonard Young
Attorney, Agent, or Firm—Hill & Simpson

[57] ABSTRACT

A group-based cryptographic code management method is proposed, in which a security policy which is used in a further communication is negotiated between group computer units and a first computer unit.

13 Claims, 5 Drawing Sheets

FIG 4
C1                                            Rj
$N1 = \text{GroupList}, \text{Cert}_I, \{N_I, SP_I, \text{SIG}\{\text{GroupList}, N_I, SP_I\}SK\_I\}PK\_Rj$
$N2 = \{N_{Rj}, N_I, I, SP_{Rj}, h(N_{Rj}, N_I, I, SP_{Rj})\}PK\_I$
$N3 = \{N_{R1}, R_1, SP_G, h(N_{R1}, R_1, SP_G)\}PK\_R1$
$\{N_{Rn}, R_j, SP_G, h(N_{Rj}, R_j, SP_G)\}PK\_Rj$
$\{N_{Rn}, R_n, SP_G, h(N_{Rn}, R_n, SP_G)\}PK\_Rn$
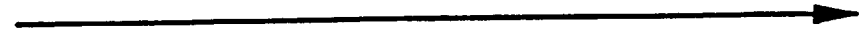
$ACK = R_j, h(N_{Rj}, N_I, I, SP_G)$

FIG 5
C1            Rj
$AN1 = GroupList, N_I, Cert_I$
$AN2 = Cert_{Rj}, \{N_{Rj}, N_I, SIG\{N_{Rj}, N_I\}SK\_Rj\}PK\_I$
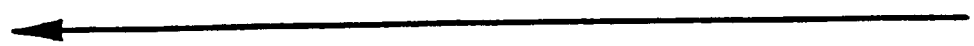
$N1 = \{N_{Rj}, R_j, SP_I, h(N_{Rj}, R_j, SP_I)\}PK\_Rj$
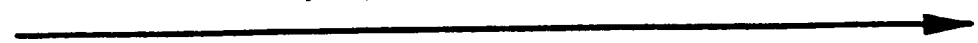
$N2 = \{N_{Rj}, N_I, I, SP_{Rj}, h(N_{Rj}, N_I, I, SP_{Rj})\}PK\_I$
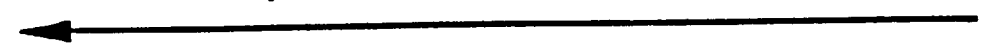
$N3 = \{N_{R1}, R_1, SP_G, h(N_{R1}, R_1, SP_G)\}PK\_R1$
$\{N_{Rn}, R_j, SP_G, h(N_{Rj}, R_j, SP_G)\}PK\_Rj$
$\{N_{Rn}, R_n, SP_G, h(N_{Rn}, R_n, SP_G)\}PK\_Rn$
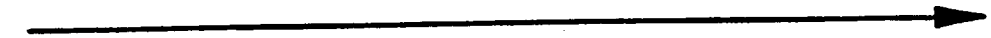
$ACK = R_j, h(N_{Rj}, N_I, I, SP_G)$
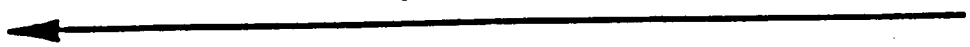

PROCESS FOR GROUP-BASED CRYPTOGRAPHIC CODE MANAGEMENT BETWEEN A FIRST COMPUTER UNIT AND GROUP COMPUTER UNITS

This application commences this National Stage of PCT/DE97/01001 filed May 16, 1997.

BACKGROUND OF THE INVENTION

During communication with a plurality of communication subscribers, it is necessary in many technical areas to use cryptographic methods to protect all the communications of all the subscribers against any form of misuse. In this case, the complexity which is required for cryptographic protection of all the communications is dependent on the respective application. Thus, for example, in private conversations it is under some circumstances not of major importance for all the cryptographically possible security measures to be used to protect the communication. However, in the case of communication with highly confidential contents, for example, very strict protection of the communication is of considerable importance.

The choice of security services, security mechanisms, security algorithms and security parameters used for communication protection is called the security policy, which is complied with during communication between communication partners.

However, since the security requirement and, linked to it, the security policy differ from communication session to communication session and from application to application, and since not all the communication subscribers actually have all the cryptographic methods available to them, it is possible when communication partners change frequently for serious discrepancies to arise in the required or possible security policy which is supported by the respective computer unit of the communication partner and can thus be ensured.

It is necessary for a standard security policy to be defined for the respective communication in every communication session within the group taking part in the communication session. Above all, it is necessary to provide a binding definition of a so-called group code, which is unambiguous for the entire group.

A summary of the cryptographic methods which can generally be used and can be used in the method can be found, for example, in Document S. Muftic, Sicherheitsmechanismen für Rechnernetze, (Security mechanisms for computer networks), Karl Hansa Verlag Muenchen, ISBN 3-446-16272-0, (1992), pages 34–70.

It is known for two communication partners to negotiate a security policy, the negotiation which is described in this document being limited, however, only to a few parameters that are defined in advance see document, E. Kipp et al, The SSL Protocol, Internet Draft, available in June 1995 on the Internet from the following address: gopher://ds.internic.net:70/00/internet-drafts/draft-hickman-netscape-ssl-01.txt.

SUMMARY OF THE INVENTION

The invention is thus based on the problem of carrying out group-based cryptographic code management between a first computer unit and any required number of other group computer units, the negotiation not being limited to specific parameters.

A first message is formed by a first computer unit and is in each case transmitted to at least some of the group computer units. The first message contains at least a first security policy proposal and a first identity checking variable. The first security policy proposal is verified in the group computer units using the first identity checking variable, and second security policy proposals are formed, in each case independently of one another, in the group computer units. This means that a specific second security policy proposal is formed in each group computer unit and is transmitted, in each case in a second message, to the first computer unit. The first computer unit receives the individual second security policy proposals, and a third message is formed and is transmitted to the group computer units. The group computer units use the third identity checking variable, which is contained in the third message, to check the integrity of the group security policy transmitted in said third message.

With this method, a group-based method is for the first time proposed for crytographic code management, by means of which it is possible to negotiate a security policy between the first computer unit and further computer units, the group computer units.

In the case of this method, the first computer unit advantageously determines which further group computer units are intended to take part in a subsequent communication using the method. This clearly means that the group computer units are "invited" by the first computer unit.

Furthermore, a considerable advantage of this method is that only the code certificate of the specific computer unit need be known in each case in the group computer units. The code certificates of the other group computer units are not important for the respective group computer unit. This characteristic of the method saves considerable complexity in code administration in the respective group computer unit, for the codes of the respective other group computer units.

The encryption of the first message and/or of the third message using a public code of the respective group computer unit to which the messages are in each case sent and decryption of the respective messages in the respective group computer unit allow confidentiality of the transmitted messages and thus of the negotiated security policy proposals and security policy. This development of the method considerably improves the cryptographic security of the method.

Furthermore, in one development, it is advantageous for the messages to contain in addition a random number, which random numbers are in each case produced either by the first computer unit or the respective group computer unit. The random numbers allow reinjection of messages which have been monitored in an authorized manner to be detected. Furthermore, the random numbers can be used for mutual authentication of the first computer unit and the group computer units.

Furthermore, it is advantageous in a development of the method for the first message to have a code certificate of the first computer unit. This development allows trustworthy authentication of the first computer unit with respect to the group computer units. This development further enhances the cryptographic security of the method.

In a development of the method, it is advantageous, before transmission of the first message, for a first authentication message to be formed in the first computer unit and to be transmitted to the group computer units. The first authentication message in this case contains at least one code certificate of the first computer unit, which code certificate is verified and stored in the group computer units.

This development results in a further improvement in the cryptographic security achieved by the method.

It is furthermore advantageous, before the transmission of the first message, for a second authentication message to be formed in each case in the group computer units and to be transmitted to the first computer unit. The second authentication messages each have at least the corresponding code certificate of the respective group computer unit from which the respective second authentication message is sent. The code certificates are verified and likewise stored by the first computer unit. This procedure allows code certificates to be exchanged between the group computer units and the first computer unit, particularly when this development is combined with the development of the method in which a first authentication message is transmitted from the first computer unit to the group computer units. Furthermore, this development improves the cryptographic security and the code administration can be carried out quickly since, in the case of this development, the individual computer units in each case subsequently have the code certificate and thus the public code of the respective communication partner.

In order further to improve the cryptographic security of the method, one development provides for the second-authentication message to have an authentication identity checking variable, which can be used in the first computer unit, to check the integrity of the second authentication message. It is furthermore advantageous for at least some of the second authentication messages in each case to be encrypted using a public code of the first computer unit. This development once again enhances the cryptographic security of the method.

In one development, it is also advantageous, after checking the integrity of the group security policy, for the group computer units in each case to form an acknowledgement message and to transmit this message to the first computer unit, as a result of which the first computer unit receives a report that the group security policy has been received and processed.

The development of the method in which at least one of the following identity checking variables is formed using a hash function considerably improves the feasibility of carrying out the method in the respective computer unit since a hash function, based on asymmetric cryptographic methods, requires considerably less computation complexity than, for example, a digital signature. The identity checking variables, which can be formed, for example, using a hash function, are, for example: the first identity checking variable, the second identity checking variable, the third identity checking variable and the authentication identity checking variable.

In a development, the method can also be subjected to a number of iterations, i.e. the negotiation of the security policy described in the following text can be carried out via a number of steps bilaterally between the first computer unit and a group computer unit, or for any required number of group computer units. This procedure can considerably enhance the granularity of the negotiation of the security policy to be used, and the efficiency and reliability of the security policy used are thus optimized.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

FIG. 4 shows a flowchart, in which the method is illustrated without authentication messages with a number of developments of the method;

FIG. 5 shows a flowchart, in which the method is illustrated with the authentication messages and a number of developments of the method.

DESCRIPTION OF THE PREFERRED EMBODIMENTS

A summary of the cryptographic methods which can be used generally and can be used in the method can be found, for example, in Document, E. Kipp et al, The SSL Protocol, Internet Draft, available in June 1995 on the Internet from the following address: gopher://ds.internic.net:70/00/internet-drafts/draft-hickman-netscape-ssl-01.txt. Further cryptographic methods are known, without limitation of their specific characteristics, to the person skilled in the art and can be used independently of their cryptographic characteristics, without further limitations on the method.

Figure 1:
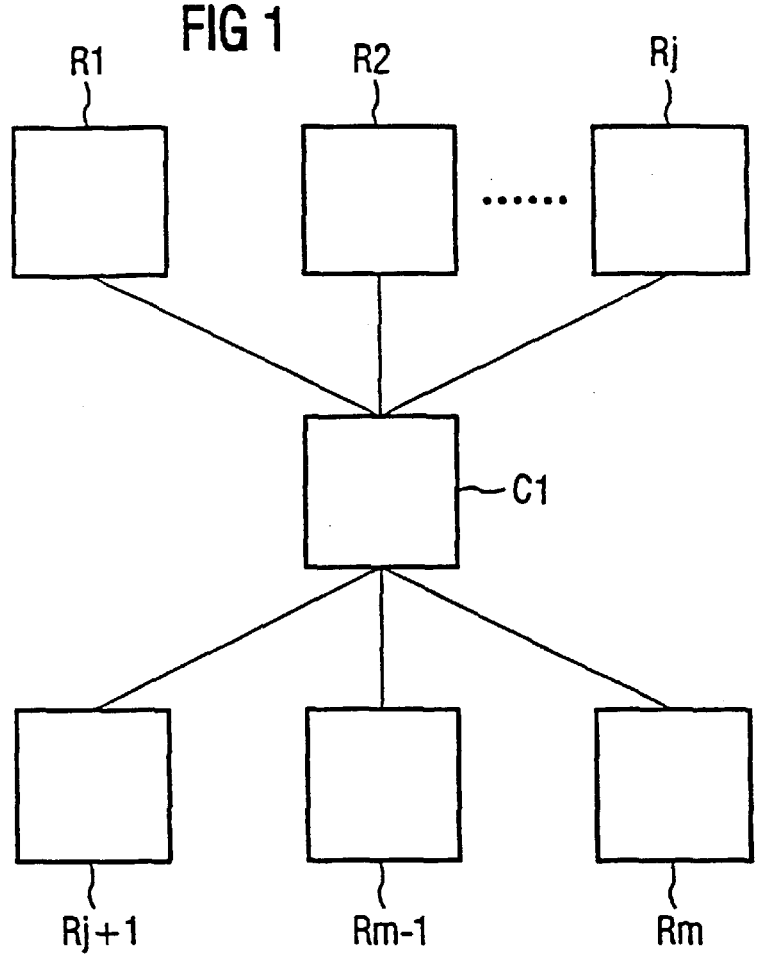
FIG. 1 shows a sketch which illustrates a first computer unit and group computer units coupled to the first computer unit.

FIG. 1 shows a first computer unit C1, which is coupled via any required couplings K to any required number m of group computer units Rj. The index j uniquely identifies each group computer unit Rj. The index j is a natural number between 1 and the number m of group computer units Rj.

For the method, all that is necessary is for the group computer units Rj to be coupled to the first computer unit C1. The group computer units Rj need not be connected to one another.

It is also unnecessary for the group computer units Rj to exchange messages with one another. This leads to a considerable saving in computation time in the group computer units Rj since in this method, each group computer unit Rj knows only one code certificate CERTI, which is described below, of the first computer unit C1 and/or one public code PK_I which is trustworthy for other reasons. Further cryptographic codes of other-group computer units Rj do not need to be stored and managed in the individual group computer units Rj in this method.

Figure 2:
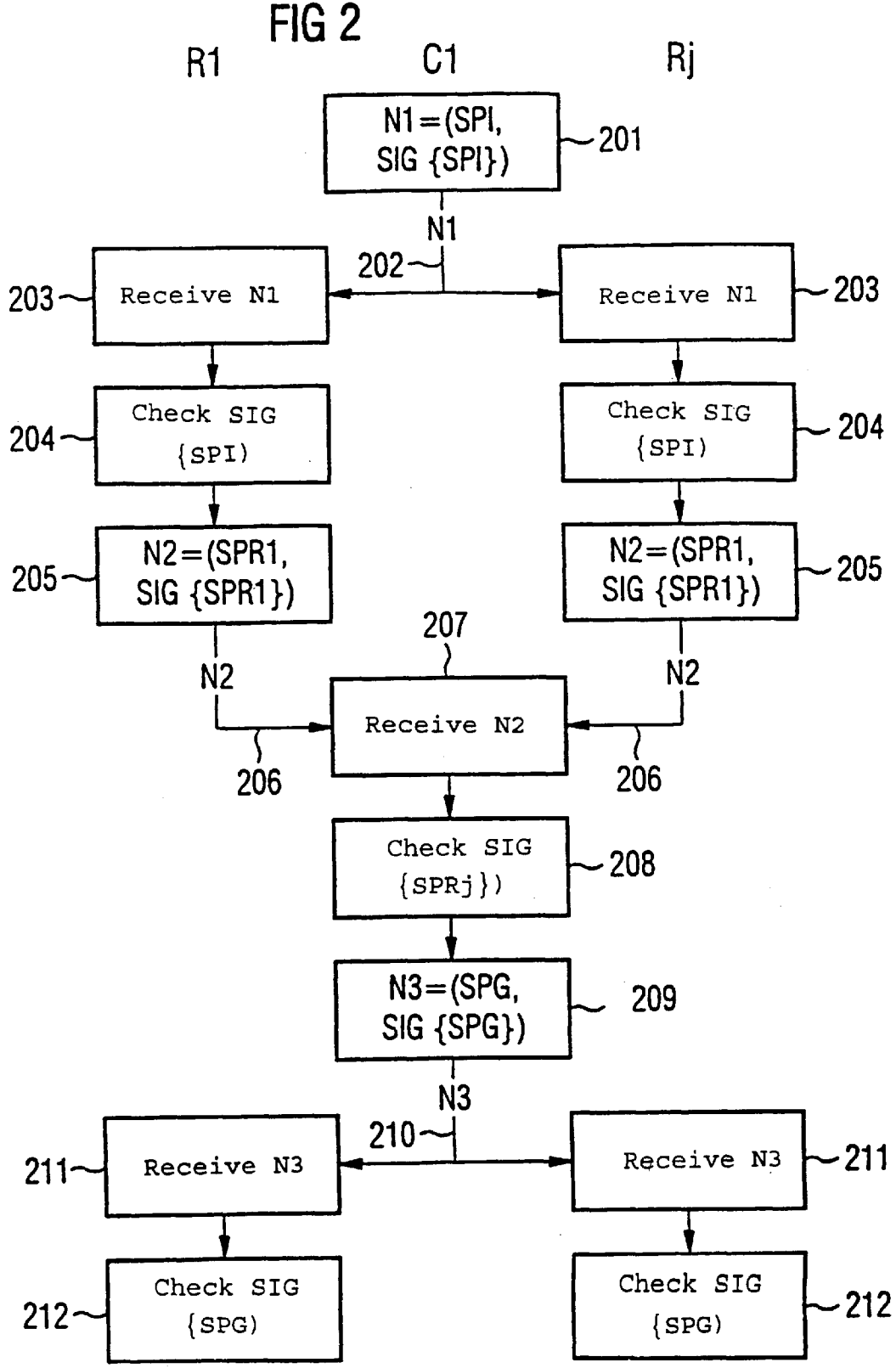
FIG. 2 shows a flowchart, in which the method steps of the method are illustrated.

FIG. 2 shows the individual method steps of the method in a flowchart. A first message N1 is formed in the first computer unit in a first step 201. The first message has at least a first security policy proposal SPI and a first identity checking variable SIG{SPI}.

The first security policy proposal SPI contains any required security services, security mechanisms and security algorithms, as well as security parameters within the security algorithms.

The security services, security mechanisms, security algorithms and security parameters are independent of the security policy followed by the first computer unit C1 and of the security policy applied to the communication.

A specific choice, planned for the respective communication, of the security services, security mechanisms, security algorithms and security parameters is transmitted as a first security policy proposal SPI in the first message N1, in a second step 202, from the first computer unit C1 to at least some of the group computer units Rj.

As can be seen, this transmission 202 of the first message N1 means that the group computer units Rj are "invited" by the first computer unit C1 to join the subsequent group communication. Together with the "invitation", the planned security policy is reported to the group computer units Rj, by the first security policy proposal SPI.

Furthermore, the first message N1 has a first identity checking variable SIG{SPI}. The first identity checking variable SIG{SPI}, which is formed at least via the first security policy proposal SPI, ensures that the identity of the first security proposal SPI is obtained for the transmission 202 for the receiver, that is to say for the respective group computer unit Rj.

The principle of the digital signature, as is described in Document [2], or else any required hash function can be used, for example, to form the identity checking variables used in this method. The term hash function in this case means a function in which it is not possible to calculate a matching input value for a given function value. Furthermore, an input character sequence of any required length is assigned an output character sequence of fixed length. Furthermore, the hash function requires collision freedom in this context, that is to say it must be impossible to find two different input character sequences which produce the same output character sequence.

Once the respective group computer unit Rj has received the first message N1 203, the first identity checking variable SIG{SPI} is used to check the identity of the first security policy proposal SPI 204.

If the identity remains proven, that is to say no transmission error has occurred, then each of the "invited" group computer units Rj forms a second message N2 205. The second message N2 in each case contains a second security policy proposal SPRj, which is specific to the respective group computer unit Rj and is formed by the respective group computer unit Rj.

The second security policy proposal SPRj may consist, for example, only of a confirmation of the first security policy proposal SPI or else of a selection of security services, security mechanisms, security algorithms and security parameters which is specific to the respective group computer unit Rj, and which are intended to be supported by the respective group computer unit Rj and used for the future communication session from the point of view of the respective group computer unit Rj.

A second identity checking variable SIG{SPRj} is furthermore in each case formed for the second security policy proposal SPRj. The second identity checking variable SIG{SPRj} is likewise contained in the second message N2.

The second message N2 is in each case transmitted from the group computer unit Rj to the first computer unit C1 206.

Once the second message N2 has in each case been received by the first computer unit 207, a check is carried out for the respectively received second message N2 to determine whether the identity of the respective second security policy proposal SPRj is still obtained for the transmission 206 to the first computer unit C1 208. The integrity of the data can be checked, for example, using a digital signature, in which the respective secret code of the sender SK_I, SK_Rj is used for coding, the public code of the sender PK_I, PK_Rj being used in each case. However, if a hash function is used to ensure integrity, then only the data to be checked are subjected to the hash function while the integrity is in each case checked in the receiver, and the result is compared with the respective identity checking variable.

Once the first computer unit C1 has received and checked all the second messages N2, or a predeterminable proportion of the second messages N2, then a third message N3 is formed in the first computer unit C1 209.

The third message N3 contains at least one group security policy SPG which states which security policy is actually now intended to be used for the subsequent communication.

The group security policy SPG can be formed automatically, for example taking account of the second security policy proposals SPRj of the group computer units Rj, or it can alternatively be defined by a user of the first computer unit C1.

The user-based definition of the group security policy SPG in the first computer unit C1 is based on the user "manually" selecting the actually used security services, security mechanisms, security algorithms and security parameters. This may, but need not, be done taking account of the second security policy proposals SPRj.

A development of the method provides for the group security policy SPG to have a common group conference code $K_C$ which is used in the subsequent communication for encryption of the wanted data. The group security policy SPG can furthermore include a group distribution code $K_D$ with which subsequent group conference codes $K_C$, which are used for encryption of the wanted data in the subsequent communication itself, are distributed from the first computer unit C1 to the group computer units Rj in encrypted form.

Furthermore, the group security policy SPG has the security services, security mechanisms, security algorithms and security parameters which are actually chosen for the further communication, that is to say the security policy that is actually followed.

Thus, both the group security policy SPG and the group conference code $K_C$ or the group distribution code $K_D$ can be transmitted confidentially and in a binding manner to the group computer units Rj.

The group conference code $K_C$ and the group distribution code $K_D$ may be either a symmetric code or an asymmetric code.

Furthermore, the third message N3 has a third identity checking variable SIG{SPG}.

The third message N3 is transmitted from the first computer unit C1 to the group computer units Rj 210. The group computer units Rj receive the third messages N3 211, and the third identity checking variable SIG{SPG} is used to check the integrity of the third message N3.

In this way, a security policy SPG which is used in the rest of the method is reported to the group computer units Rj, that is to say to the other subscribers to the subsequent communication, it being possible to take account of proposals or requests from the group computer units Rj with respect to the security policy to be used.

A development of the method provides not only an iteration, that is to say a negotiation phase for the security policy proposals SPI, SPRj, SPG, but multiple communication between the first computer unit C1 and the group computer units Rj. The other messages Nn used in this case and their identity checking variables result from the basic process described above. This development ensures increased granularity in the negotiation of the finally used security policy, and thus better optimization of the security services, security mechanisms, security algorithms and security parameters to be used.

Various developments of the method envisage improvement of the cryptographic security of the method.

In this case, one development provides for the first message N1 and/or the third message N3 in each case to be encrypted using a public code PK_Rj of the respective group computer unit Rj, and for the first message N1 and/or the third message N3 to be decrypted in the respective group computer unit Rj using a secret code SK_Rj of the respective group computer unit Rj. In this way, the confidentiality of the first message N1 and of the third message N3 are ensured during the transmission 202, 206.

Further cryptographic actions, for example the reinjection of intercepted or monitored data, are taken into account by the use of random numbers NI, NRj in the messages N1, N2, N3 and in authentication messages AN1, AN2 which are described below. If a first random number NI is formed in the first computer unit C1, and the first random number N1 is transmitted, for example, in the first message N1 or in a first authentication message AN1, which is described below, to the respective group computer units Rj, then the first random number NI can also be used for authentication of the respective group computer unit Rj with respect to the first computer unit C1, particularly in the case when the first random number NI is transmitted in encrypted form in the first message N1 or the first authentication message AN1. The authentication is in this case carried out, for example, by the first random number NI from the respective group computer unit Rj being added to the second message N2 or the second authentication message AN2, and the second message N2 or the second authentication message AN2, respectively, being transmitted in encrypted form to the first computer unit C1. This ensures for the first computer unit C1 that the respective message can have been sent only from a group computer unit Rj.

This authentication effect can, however, also be achieved by using asymmetric encryption methods in that, for example, the second message N2 or the second authentication message AN2 is in each case encrypted using a secret code SK_I, SK_Rj of the respective sender, and the respective message being decrypted in the receiver using a public code PK_I, PK_Rj of the sender. In this way, the receiver is assured that the sender has also actually sent the respective message.

Furthermore, it is also provided for second random variables NRj, which naturally differ from one another between the individual group computer units Rj, to be formed independently of one another in the group computer units Rj, and to be added to the individual messages.

The individual random numbers are in each case stored by the receiver and can be reused in other messages, for example for authentication.

The messages in which the random numbers NI, NRj can be used, for example, in the method are described below with reference to FIG. 4.

Figure 3:
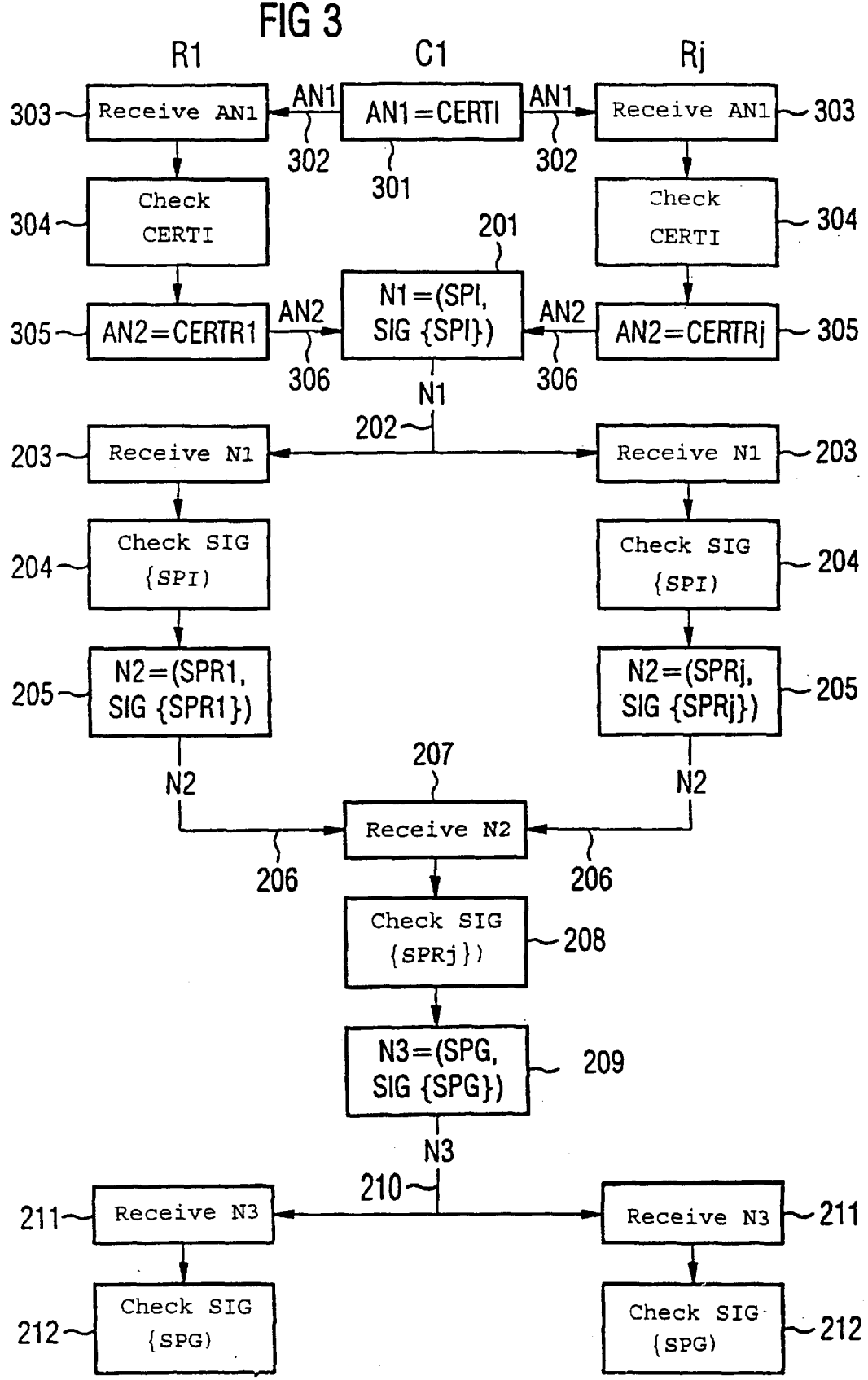
FIG. 3 shows a flowchart, in which a development of the method using additional authentication messages is illustrated.

In FIG. 3, the method described in FIG. 2 is provided with a development in which a first authentication message AN1 is formed by the first computer unit C1 at the start of the method 301, and is in each case transmitted to the respective group computer unit 302. The first authentication message AN1 contains at least one code certificate CERTI of the first computer unit C1.

After receipt 303 of the first authentication message AN1 and verification 304 of the code certificate CERTI of the first computer unit C1, a second authentication message AN2 is formed in each group computer unit Rj, and is in each case transmitted from the group computer unit Rj to the first computer unit C1 306.

In this development, the second authentication message AN2 contains at least in each case one code certificate CERTRj of the respective group computer unit Rj.

This procedure results, after the method has been carried out, in both the group computer units Rj and the first computer unit C1 each having the trustworthy public code PK_I, PK_Rj of the respective communication partner. The code certificates CERTI, CERTRj are stored in the first computer unit C1 and the respective group computer unit Rj, respectively.

For further cryptographic protection of the method, one development provides for the individual code certificates CERTI, CERTRj to be verified after they have respectively been received.

The second authentication message AN2 in one development furthermore has an authentication identity checking variable SIG{NRj, NI}. The authentication identity checking variable SIG{NRj, NI} is in turn used to ensure the identity of the authentication message AN2, which is second in this case.

Furthermore, in a development, at least a part of the second authentication message AN2 is encrypted using a public code PK_I of the first computer unit C1, which ensures confidentiality for the respective part of the second authentication message AN2.

FIG. 4 shows the method with a number of developments. Although they are illustrated together in a figure, the developments are in no way envisaged only in the complete overall combination of the developments, but in each case only in individual extensions or any required combination of developments.

For example, the first message N1 also has a list of addresses of the group computer units Rj, which list is called the group list GL below. Furthermore, the first message N1 has the code certificate CERTI of the first computer unit C1. In this development, the first random number NI, the first security policy proposal SPI and the first identity checking variable SIG{GL, NI, SPI} are encrypted using the public code PK_Rj of the respective group computer unit Rj. The first identity checking variable SIG{GL, NI, SPI} is in this example formed by a digital signature using the secret code SK_I of the first computer unit C1 via the group list GL, the first random number NI and the first security policy proposal SPI.

This development ensures that even the first message N1 ensures the authentication of the first computer unit C1 with regard to the respective group computer unit Rj, the confidentiality of the first security policy proposal SPI, avoidance of the first message N1 being reinjected, and the integrity of the group list GL, of the first random number NI and of the first security policy proposal SPI.

Once the encrypted data have been decrypted using the secret code SK_Rj of the respective group computer unit Rj, and the digital signature, that is to say the first identity checking variable SIG{GL, NI, SPI} has then been verified 204, the respective group computer unit Rj contains the group list GL, the public code PK_I of the first computer unit C1, the first random number NI as well as the first security policy proposal SPI.

After the formation of the respective second security policy proposal SPIRj in the respective group computer unit Rj 205, the second message N2 is formed and is transmitted to the first computer unit C1 206.

In this example with the developments, the second message N2 contains, for example, the following elements:

the second random number NRj, the first random number NI, identity statement I of the first computer unit C1, the second security policy proposal SPRj, a hash value h(NRj, NI, I, SPRj) which is formed via the variables mentioned above and forms the second identity checking variable SIG{SPRj}.

In this development, the second message N2 is encrypted using the public code PK_I of the first computer unit C1.

The second message N2 is received by the first computer unit C1 207, and the hash value h(NRj, NI, I, SPRj) of the second message N2, that is to say the second identity checking variable SIG{SPRj} is checked 208, as a result of which the integrity of the variables, via which the hash value h(NRj, NI, I, SPRj) was formed, is ensured.

Once the first computer unit C1 has received 207 and evaluated a number which can be predetermined, for example all or more than one predeterminable limit of second messages N2 from the first computer units C1, the third message N3 is formed 209 in the first computer unit C1 and is in each case transmitted, as a copy, to the individual group computer units Rj.

In a development of the method, an improvement in efficiency is achieved by the method being carried out such that a so-called multicast mechanism for copying a message simultaneously to the group computer units Rj is offered by a transport network which is used for transmitting the data in the case of the method. The multicast mechanism can be achieved, for example, either directly in the transport network itself as a service, for example by means of a copying unit, for example an ATM switch, or by corresponding multicast/broadcast addressing in the first computer unit C1 itself.

Depending on the addressee, that is to say depending on the group computer unit Rj to which the third message N3 is transmitted, the third messages N3 contain, for example, the following elements:

the second random number NRj, an identity statement Rj of the respective group computer unit Rj, the group security policy SPG as well as a hash value h(NRj, Rj, SPG) which is formed via the variables mentioned above and forms the third identity checking variable SIG{SPRj}.

The first messages N1 and the third message N3 are in this development encrypted using the public codes PK_Rj of the respective group computer unit Rj.

The third messages N3 are transmitted 210 to the respective group computer units Rj and are received there 211, the third message N3 is in each case decrypted using the secret code SK_Rj of the respective group computer unit Rj, and the hash value h{NRj, Rj, SPG} is checked 212.

Furthermore, a development is described in FIG. 4, in which the individual group computer units Rj each transmit an acknowledgement message ACK to the first computer unit C1.

The acknowledgement messages ACK are formed in the group computer units Rj. Depending on the group computer unit Rj which forms the acknowledgement message ACK, the acknowledgement messages ACK in this development contain, for example, the following elements;

the identity statement Rj of the group computer unit Rj which is sending the acknowledgement message ACK, as well as a hash value h(NRj, NI, I, SPG) which is formed at least via the second random number NRj, the first random number NI, the identity statement I of the first computer unit C1 and via the group security policy SPG.

The acknowledgement message ACK is used by the respective group computer unit Rj to confirm to the first computer unit C1 that it has reliably received the information about the group security policy SPG.

FIG. 5 shows a further development in which, rather than as is presupposed in the development illustrated in FIG. 4, all the trustworthy public codes PK_Rj of the group computer unit Rj are available in the first computer unit C1.

In this development, the public codes PK_Rj, PK_I of the computer unit C1, Rj are exchanged at the start of the method, mutual authentication of the computer units C1, Rj being carried out at the same time.

The first authentication message AN1, which is formed in the first computer unit C1 and is transmitted to the group computer units Rj, contains, for example, the following elements:

the group list GL, the first random number NI, the code certificate CERTI of the first computer unit C1.

The code certificate CERTI is evaluated and verified by the respective group computer unit Rj, and the first message N1 is stored with the elements of said certificate.

The second authentication message AN2, which is formed in the respective group computer unit Rj and is transmitted to the first computer unit C1, in this development contains, for example, the following elements:

the second random number NRj, the first random number NI, the authentication identity checking variable SIG{NRJ, NI}, in each case one code certificate CERTRj of the respective group computer unit Rj.

The elements of the second authentication message AN2 are all encrypted, up to the respective code certificate CERTRj of the respective group computer unit Rj, using the public code PK_I of the first computer unit C1. This ensures the confidentiality of the random numbers NRj, NI as well as the signature via the random numbers, that is to say the authentication identity checking variable SIG{NRJ, NI}.

The second authentication messages AN2 are received in the first computer unit C1 and are encrypted using the secret code SK_I of the first computer unit C1.

The authentication identity checking variable SIG{NRJ, NI} is also verified.

After this, the first message N1 is formed 201 in the first computer unit Cl, and is transmitted 202 to the respective group computer unit Rj.

The first message N1 contains, in each case independently of the respective group computer unit Rj to which the first message N1 is sent, the following elements, for example:

the respective second random number NRj which has been transmitted from the respective group computer unit Rj to the first computer unit C1, the respective identity statement Rj of the group computer unit Rj, the first security policy proposal SPI, a hash value h(NRj, Rj, SPI) which has been formed at least via the second random number NRj, the identity variable NRj of the group computer unit Rj and via the first security policy proposal SPI.

The hash value h(NRj, Rj, SPI) forms the first identity checking variable SIG{SPI}.

The first message N1 is transmitted 202 in encrypted form to the respective group computer unit Rj, the first message N1 in each case being encrypted using the public code PK_Rj of the respective group computer unit Rj.

After receipt 203 of the encrypted first message N1, the first message N1 is in each case decrypted in the group computer units Rj using the respective secret code SK_Rj of the respective group computer unit Rj, and the integrity of the first message N1 is verified 204 using the hash value h(NRj, Rj, SPI). Furthermore, the second message N2 is formed 205 in the group computer units Rj, and is in each case transmitted to the first computer unit C1.

In this development, the second message N2 contains, for example, the following elements:
- the second random number NRj,
- the first random number NI,
- the identity statement I of the first computer unit C1,
- the respective second security policy proposal SPRj,
- a hash value h(NRj, NI, I, SPRj), which is formed at least via the second random number NRj, the first random number NI, the identity statement I of the first computer unit C1 and the second security policy proposal SPRj.

The hash value h(NRj, NI, I, SPRj) forms the second identity checking variable SIG{SPRj}.

The second message N2 is in this development transmitted in encrypted form, the second message N2 in each case being encrypted using the public code PK_I of the first computer unit C1.

Once the respective second message N2 has been received 207 in the first computer unit C1, the second message N2 is decrypted using the secret code SK_I of the first computer unit C1, and the identity is ensured by verification of the hash value h(NRj, NI, I, SPRj).

The group security policy SPG is then determined.

Furthermore, the third message N3 is formed 209 in the first computer unit C1 for each group unit Rj, which third messages N3 in each case differ only by those elements which are specific to the respective group computer unit Rj.

In this development, the third message N3 in each case contains, for example, the following elements:
- the respective second random number NRj,
- the respective identity statement Rj of the group computer unit Rj,
- the group security policy SPG,
- a hash value h(NRj, Rj, SPG) which is formed at least via the second random number NRj, the identity statement Rj of the group computer unit Rj and the group security policy SPG.

The hash value h(NRj, Rj, SPG) forms the third identity checking variable SIG{SPG}.

The respective third message N3 is likewise transmitted 210 in encrypted form in this development. In this case, the third message N3 is in each case encrypted using the public code PK_Rj of the respective group computer unit Rj.

Once the third message N3 has in each case been received 211 in the group computer unit Rj, the third message N3 is decrypted using the respective secret code SK_Rj of the group computer unit Rj, and the hash value h(NRj, Rj, SPG) is verified 212.

Furthermore, the acknowledgement message ACK is formed in the respective group computer unit Rj and is transmitted to the first computer unit C1.

The acknowledgement message ACK in this example has the following elements:
- the identity statement Rj of the respective group computer unit Rj,
- a hash value h(NRj, NI, I, SPG), which is formed at least via the second random number NRj, the first random number NI, the identity variable I of the first computer unit C1 and the group security policy SPG.

The method can be used both in so-called on-line code management scenarios and in so-called off-line code management scenarios.

The developments illustrated in FIGS. 4 and 5 to this extent represent an advantageous development since by means of this procedure it is possible to keep to a minimum the number of digital signatures required to ensure the integrity of the transmitted data and to use hash values whose formation is less computer intensive, instead of the digital signatures whose formation is computer intensive.

In this case, at least the first identity checking variable SIG{SPI}, the second identity checking variable h(SPRj) and the third identity checking variable h(SPG) as well as the authentication identity checking variable SIG{NRJ, NI} can be formed in any required combination by the formation of hash values.

In FIGS. 4 and 5, the first identity checking variable SIG{SPI} is formed by the hash value h(NRj, Rj, SPI) or the digital signature SIG{GL, NI, SPI}.

The second identity checking variable SIG{SPRj} is formed in the method illustrated in FIG. 4 by the hash value h(NRj, NI, I, SPRj), and in the method illustrated in FIG. 5 by the hash value h(NRj, NI, I, SPRj).

The respective third identity checking variable SIG{SPG} is in each case formed by the hash value h(NRj, Rj, SPG) in the methods illustrated in FIGS. 4 and 5.

Furthermore, the authentication identity checking variable SIG{NRj, NI} is formed in the method illustrated in FIG. 4 by the digital signature SIG{NRj, NI}, and in the method illustrated in FIG. 5 by the hash value h(NRj, NI, I, SPRj).

A development of the method provides for the use of digital signatures in the entire method, with any required identity checking variables. The use of digital signatures indirectly achieves binding and indisputable transmission for the respective message via the identity checking variables, which have been formed using a digital signature. If digital signatures are formed for all the identity checking variables, then binding and indisputable, group-based code management is achieved with a negotiation phase for the security policy.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for group-based declaration of a cryptographic, common security policy between a first computer unit and group computer units, comprising the steps of:

forming in the first computer unit a first message;

providing in the first message at least a first security policy proposal and a first identity checking variable;

transmitting the first message from the first computer unit to at least some of the group computer units;

carrying out the following steps in the group computer units;

receiving the first message by a respective group computer unit of the group computers;

checking integrity of the first security policy proposal based on the first identity checking variable;

forming a second message in each case, the second message having at least a second security policy proposal and a second identity checking variable;

transmitting the second messages from the group computer units to the first computer unit;

receiving the second messages by the first computer unit;

checking integrity of each respective second security proposal using the corresponding second identity checking variable;

forming a third message by the first computer unit;

providing in the third message at least one group security policy and a third identity checking variable;

transmitting the third message from the first computer unit to at least some of the group computer units;

carrying out the following steps in the group computer units;

receiving the third message by respective group computer units; and checking the integrity of the group security policy using the third identity checking variable.

2. The method according to claim 1, wherein at least one of the first message and the third message is in each case encrypted using a public code of the group computer unit, and wherein at least one of the first message and the third message is decrypted in the group computer unit using a secret code of the respective group computer unit.

3. The method according to claim 1, wherein each of the first, second and third messages has at least one random number.

4. The method according to claim 1, wherein the first message has a code certificate of the first computer unit.

5. The method according to claim 1, wherein before transmission of the first message, a first authentication message is formed in the first computer unit, wherein the first authentication message has at least one code certificate of the first computer unit, wherein the first authentication message has at least one code certificate of the first computer unit, wherein the first authentication message is transmitted from the first computer unit to at least some of the group computer units, and wherein the group computer units verify and store the code certificate of the first computer unit.

6. The method according to claim 1, wherein before transmission of the first message and in at least some of the group computer units, a second authentication message is in each case formed in the group computer units, wherein the second authentication messages in each case have at least code certificates of the group computer units, wherein the second authentication messages are transmitted from the group computer units to the first computer unit, and wherein the first computer unit verifies and stores the code certificates of the group computer units.

7. The method according to claim 6, wherein each of the first, second and third message has at least one random number, wherein the second authentication messages have an authentication identity checking variable, and wherein at least some of the second authentication messages are encrypted using a public code of the first computer unit.

8. The method according to claim 1, wherein, after checking the integrity of the group security policy, each of the group computer units forms an acknowledgment message, wherein the acknowledgment messages are transmitted from the group computer units to the first computer unit, and wherein the acknowledgment messages are checked for integrity, in the first computer unit.

9. The method according to claim 1, wherein at least one of the following identity checking variables is formed using a hash function:
the first identity checking variable,
the second identity checking variable,
the third identity checking variable,
the authentication identity check variable.

10. The method according to claim 1, wherein the group security policy contains at least one group distribution code for encryption and distribution of group conference codes which continue to be used, or of a group conference code.

11. The method according to claim 1, wherein a plurality of further messages having further security policy proposals are formed and transmitted by the first computer unit and by the group computer units.

12. The method according to claim 1, wherein a multicast mechanism is provided for copying messages to be transmitted.

13. The method according to claim 1, wherein at least some of the identity checking variables are formed using a digital signature.

* * * * *